United States Patent [19]

Büning et al.

[11] 3,928,684

[45] Dec. 23, 1975

[54] STRENGTH CHARACTERISTICS OF GLASS FIBER REINFORCED VINYL CHLORIDE THERMOPLASTICS AND CHLORINATION PRODUCTS THEREOF

[75] Inventors: Robert Büning, Troisdorf-Sieglar; Peter Loebler, Troisdorf; Werner Trautvetter, Troisdorf-Spich, all of Germany

[73] Assignee: Dynamit Nobel Aktiengesellschaft, Troisdorf, Germany

[22] Filed: May 24, 1973

[21] Appl. No.: 363,769

[30] Foreign Application Priority Data

June 7, 1972 Germany............................ 2227650

[52] U.S. Cl. .................. 428/297; 428/391; 428/392; 428/429; 428/447; 427/409; 260/42.15; 260/42.18; 260/80.71
[51] Int. Cl.² .................... B32B 5/22; B32B 17/06
[58] Field of Search........... 260/42.14, 42.15, 42.18, 260/80.71; 117/126 GB, 126 GS; 161/93, 161/175, 143

[56] References Cited

UNITED STATES PATENTS

| | | | |
|---|---|---|---|
| 3,472,729 | 10/1969 | Sterman | 161/93 |
| 3,493,461 | 2/1970 | Sterman | 161/93 |
| 3,555,051 | 1/1971 | Marsden | 260/42.15 X |
| 3,623,937 | 11/1971 | Gasaway | 161/93 X |
| 3,755,252 | 8/1973 | Büning et al | 260/80.71 X |

*Primary Examiner*—George F. Lesmes
*Assistant Examiner*—Alan T. McDonald
*Attorney, Agent, or Firm*—Burgess, Dinklage & Sprung

[57] ABSTRACT

Polyvinylchloride or chlorinated polyvinylchloride polymer article reinforced with glass fibers coated with vinyl chloridevinyl trialkoxysilane copolymers in an amount effective to increase the strength characteristics of the article. The copolymer can include at least one of carboxylic acid vinyl esters, unsaturated mono- or dicarboxylic acid esters, and alkyl vinyl ethers.

19 Claims, No Drawings

STRENGTH CHARACTERISTICS OF GLASS FIBER REINFORCED VINYL CHLORIDE THERMOPLASTICS AND CHLORINATION PRODUCTS THEREOF

BACKGROUND

The reinforcing of vinyl chloride homopolymers and copolymers and their chlorination products, hereinafter called VC thermoplastics, with a variety of glass fiber materials is in the prior art.

In the present state of the art, glass fiber materials, such as loose chopped glass staple fibers, but especially glass fiber mats and fabrics and glass silk fabrics can be used to reinforce VC thermoplastics so as to achieve an appreciable improvement of their bending strength, tensile strength, modulus of elasticity, botch impact toughness and Vicat thermal stability of shape as well as dimensional stability and stability of shape in general. Such improvements of the mechanical characteristics, however, have hitherto been achievable in the manufacture of laminates using commercial glass fiber materials only by adhering to quite special conditions in the working of the VC thermoplastics.

The amount of such improvement in a VC thermoplastic depends not only on the nature and structure of the glass fiber material and its percentage of the weight and volume of the laminate, but also to a very important extent on the choice of the thermoplastification conditions, i.e., the press pressure and the pressing temperature in the production of the laminate, and also on the kind of sizing or adhesive used on the glass fiber material.

The improvement of the bond which is achieved by using the sizes and adhesives of the prior art is actually very slight. For example, with the adhesives which are the most effective in improving the bond, namely γ-glycidyl- or γ-methacryloxypropyltrialkoxysilane, and chromium methacrylate complex compounds, an improvement of the strength characteristics, especially bending strength, of only about 10 to 20% above that of adhesive-free glass fiber materials is achieved, when the customary amount of the finish is used, of 0.1 to 0.5 wt-%, on the glass fiber surface.

By further increasing the amount of adhesive or coating on the glass fiber surface to as much as 5 wt-% — which is economically unacceptable with these adhesives in many cases — bending strength improvements of only about 30 to 35% are achieved — in other words, no substantial additional increase of strength.

THE INVENTION

It is the object of this invention to improve the reinforcement of VC thermoplastics which is achieved through glass fiber materials by providing special sizing agents for the glass fiber materials, and also thereby to simplify the conditions of the manufacture of laminates. This and other objects are achieved in the manner described hereinafter.

The subject of the invention is a process for improving the strength characteristics of glass fiber reinforced VC thermoplastics, which is characterized by the fact that the fibers of the glass fiber material are coated, prior to incorporation into the VC thermoplastics, with a layer of limited thickness of vinyl chloride-vinyltrialkoxysilane copolymers, which is preferably additionally modified by copolymerization with carboxylic acid vinyl esters and/or unsaturated mono- or dicarboxylic acid esters and/or alkyl vinyl ethers, thereby forming a bonding layer between the glass fiber surface and the vinyl chloride thermoplastics which improves the bond between fiber and matrix.

Trialkoxysilanes that can be used are especially those having 1 to 18 carbon atoms in each alkoxy group. Those with 1 to 4 carbon atoms in the alkoxy group are preferred, that is, those having methyl, ethyl, n- or i-propyl groups or any of the monomeric butyl groups.

The vinyl trialkoxysilanes can be of the formula:

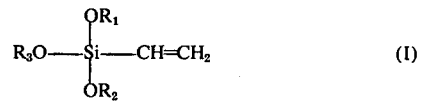

wherein $R_1$, $R_2$, and $R_3$ are alike or different branched or unbranched, saturated alkyl groups, and is each of 1 to 18 carbon atoms, preferably 1 to 4 carbon atoms.

The carboxylic acid vinyl esters can be of the formula:

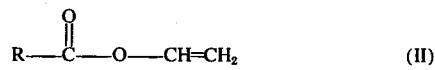

wherein R is a branched or unbranched, saturated alkyl group of 1 to 30, preferably 1 to 20 carbon atoms.

Carboxylic acid vinyl esters that can be used include vinyl acetate, vinyl propionate, fatty acid vinyl esters such as vinyl laurate and vinyl stearate, and mixtures of β-alkylpivalic acid vinyl esters or of vinyl versatic esters with 9 to 15 carbon atoms in the acid group. The versatic esters are vinyl esters of acids with a branching of the chain at the α carbon atom of the formula:

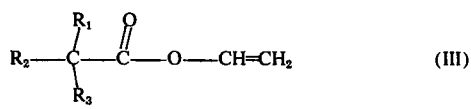

wherein $R'_1$, $R'_2$, and $R'_3$ are branched or unbranched, saturated alkyl groups of 6 to 18, preferably 9 to 15 carbon atoms, at least one of $R'_1$, $R'_2$, and $R'_3$ is a methyl group, and at least one is a higher, branched or unbranched, saturated alkyl group of 6 to 18, preferably 9 to 15 carbon atoms and preferably having a chain of 8 to 12 carbon atoms. Examples of the versatic esters are:

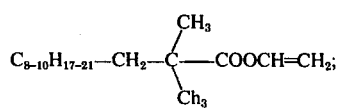

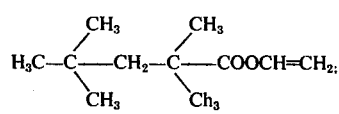

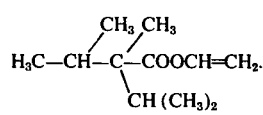

Any desired alkyl or cycloalkyl esters of aliphatic mono- and dicarboxylic acids may be used as the unsaturated mono- and dicarboxylic acid esters. The chain length of the acid group and alcohol group is not limited of itself, although it amounts to preferably 2 to 20 C in the acid group and 1 to 20 C in the alcohol group, and one of the groups is to have more than three carbon atoms.

The monocarboxylic acid esters can be of the formula:

$$R_4 - \overset{\overset{O}{\|}}{C} - OR_5 \quad (V)$$

wherein $R_4$ is a branched or unbranched alkene radical of 2 to 12, preferably 2 to 8 carbon atoms, and is preferably ethylenically unsaturated, e.g., monoethylenically unsaturated, and $R_5$ is a branched or unbranched, saturated alkyl group of 1 to 20 preferably 1 to 10 carbon atoms.

Esters of dicarboxylic acids, especially fumaric and maleic acid, such as di-2-ethylhexyl and dicyclohexyl fumaric acid ester and maleic acid ester, are preferred, although esters of monocarboxylic acids, especially acrylic and also methacrylic acid esters, such as butyl, i-butyl and isooctyl acrylate and methacrylate can also be used.

The dicarboxylic acid esters can be of the formula:

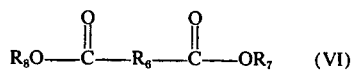

$$R_8O - \overset{\overset{O}{\|}}{C} - R_6 - \overset{\overset{O}{\|}}{C} - OR_7 \quad (VI)$$

wherein $R_6$ is a branched or unbranched, unsaturated, preferably ethylenically unsaturated, e.g., monoethylenically unsaturated, polymethylene bridge of 2-10, preferably 2 to 6 carbon atoms, and $R_7$ and $R_8$ are alike or different, and is each a branched or unbranched, saturated alkyl group of 1 to 18, preferably 1 to 12 carbon atoms.

Preferred alkyl vinyl ethers are those having 3 to 15 carbon atoms in the alkyl radical, such as 2-ethylhexyl vinyl ethers of the formula $C_4H_9 —CH(C_2H_5)—CH_2—O—CH=CH_2$ and isobutyl vinyl ether.

The alkyl vinyl ether can be of the following formula:

$$R_9—O—CH = CH_2$$

wherein $R_9$ is a branched or unbranched, saturated alkyl group of 1 to 25, preferably 1 to 20 carbon atoms.

The copolymer for the bonding layer can best be one consisting of 90 to 95 wt-% vinyl chloride and 5 to 10 wt-% vinyltrialkoxysilane, a modified copolymer being advantageous which is composed of 68 to 77 wt-% vinyl chloride and 4 to 12 wt-% vinyl trialkoxysilane, plus 12 to 27 wt-% of a carboxylic acid vinyl ester and/or unsaturated mono- or dicarboxylic acid ester and/or alkyl vinyl ether.

Vinyl chloride-vinyl trialkoxysilane copolymers particularly well suited for bonding sizes consist of 90 to 95 wt-% vinyl chloride and 5 to 10 wt-% vinyl triethoxysilane. Also especially suitable are the vinyl chloride-vinyl triethoxysilane copolymers which are modified by the above-named monomeric polymerization components and which are composed of 8 to 17%β-alkyl pivalic acid vinyl ester and 4 to 10 wr-% dichclohexylfumarate in addition to 67 to 77 wt-% vinyl chloride and 4 to wt-% 12 wt-% vinyl triethoxysilane.

In this composition of the copolymers the β-alkyl pivalic acid vinyl ester and/or the dicyclohexylfumarate may be replaced wholly or partially by the alkyl vinyl ether, 2-ethylhexyl vinyl ether.

The bonding sizes composed of the above-described vinyl chloride-vinyl trialkoxysilane copolymers can be applied, in conventional ways, to the glass fibers in coating thicknesses of 20 to 700 millimicrons, or 0.1 - 15.0 wt.% of the weight of the fibers, as agents for improving the strength characteristics of glass fiber reinforced VC thermoplastics, and they attain their greatest effectiveness when their coating thicknesses range between 80 and 400 millimicrons, or 0.4 to 8.0 wt. %. In most cases the maximum effectiveness is attained in bonding agent coating thicknesses of 200 to 300 millimicrons or 3.0 to 6.0 wt.%. Although a further increase of the coating thickness does not result in any great additional improvement of the strength characteristics of glass fiber reinforced VC thermoplastics, is generally results in improvements of the optical transparency of the VC thermoplastic laminates. Too great a thickness of the bonding agent coating, e.g., beyond, say, 700 millimicrons, often results in a diminution of the strength characteristics of such VC thermoplastic laminates.

These bonding agent coatings can be applied to the glass fiber material by means of a wet impregnation, either with a solution in organic solvents or with an aqueous dispersion of the copolymer. For such wet impregnation it is advantageous, although not necessary, to perform it in a vacuum or partial vacuum to achieve a more complete surface wetting of the individual glass fibers in the multifilament spun threads of the mats and fibrics. A heat stabilizer commonly used for VC polymers, especially an epoxidized unsaturated fatty acid ester such as epoxidized soybean oil (Advastab 39 of Deutschen Advance GmbH), is added to the solutions or dispersions used for the wet impregnation, in a quantity equal to 1 to 2% of the copolymer.

The glass fiber materials to be used for wet impregnation in order to reinforce VC thermoplastics may be commercial glass fiber mats and fabrics as well as glass silk fabrics, as well as chopped glass silk 5 to 25 mm long and glass staple fibers of a length of 0.01 to 0.4 mm, for example, and a thickness of 5 to 10 microns. The glass fiber material may be in the desized state or may be dressed with a finish. The preliminary dressing of the glass fiber material with a Volan [$CH_2 = C(CH_3)COOCH_2OH$].4HCl or silane finish does not play an important part in determining the degree of the additional reinforcing effect of the bonding layer. On finish-free glass fiber material the reinforcing effect of the bonding layer is still just as high. A previously applied silane finish may make the glass fibers water repellent thereby contributing to the improvement of the moisture resistance of glass fiber reinforced VC thermoplastics whose glass fibers are covered with the bonding layers described above.

Solvents for copolymers of the bonding layer will be primarily acetic acid ethyl esters, ketones such as butanone, tetrahydrofuran and, in some cases, acetone, aromatic hydrocarbons such as benzene, toluene and xylene, or mixtures of same.

The aqueous dispersions are produced by copolymerization in emulsion, using silanes insensitive to hydrolysis, such as vinyl-tri-tertiary-butoxysilane.

The application of the bonding layer composed of the modified and unmodified vinyl chloride-vinyl trialkoxysilane copolymers can be done at any time prior to the actual thermoplastic manufacture, i.e., before pressing to form the multi-layer laminate. This bonding layer can be applied to the glass fiber material before, during or after the production of the mat or web, i.e., even at the time of the application of the finish. The same applies to the wet impregnation of glass silk strands or rovings in the production of chopped glass silk staple fibers. In some cases it may be advantageous to perform the wet impregnation and then drying of the bonding size prior to chopping the glass silk strands into staple fibers of a particular length. An already chopped glass silk staple fiber can also be coated with this kind of bonding size by the wet impregnation method if the quantity of the size to be applied is not excessive. These vinyl chloride-vinyl trialkoxysilane copolymers can likewise be used direct from the manufacturer as special sizes for glass fiber materials which are to be used specifically for the reinforcement of VC thermoplastics. The unsized fibers can be coated or the fibers sized with known sizing agents such as chromiom methacrylate complex or substituted alkyltrialkoxysilane, can be coated.

In the employment of glass fiber mats or fabrics and glass silk fabrics which are provided with bonding sizes described above, these webs of matting or fabric are alternately sandwiched together, in accordance with the required glass fiber content, with VC thermoplastic sheets, and then pressed to form the laminate. The pressing of the lamintes is performed in the thermoplastic temperature range of the VC thermoplastics, namely at 180° to 210°C and at pressures of 10 to 150 kp/cm². However, slightly different pressing conditions are possible, especially when the glass fiber content in the laminate is high. In general, lamintes may be prepared having a glass fiber content amounting to 10 to 60% of the weight of the laminate.

VC thermoplastics for the manufacture of laminates are understood to include vinyl chloride homopolymers regardless of how they are manufactured and their characteristics, especially the types commercially sold for hard PVC. Also usable as VC thermoplastics are copolymers of vinyl chloride with contents of 2 to 20 wt-% of other olefinically unsaturated monomers such as ethylene, propylene, vinylidene chloride etc. The chlorination products of the named VC polymers, espcially chlorinated PVC, are also suitable, the chlorine content being between about 57 and 73%. In general, those VC thermoplastics used in the known products corresponding to the products of the invention, can be used.

In the following Examples 1 to 13, to permit comparison of the bonding layer effects, the material composition, glass fiber content and structure of the laminates, as well as the pressing conditions, press pressure and temperature, have been kept constant, and are selected so that the effect of the bonding layers will be expressed mathematically, only the quantity applied and the type of bonding size material being varied. The glass fiber content of the laminates has consequently been kept constant at 30 wt-%.

The rest of the examples demonstrate additional possibilities for varied bonding sizes and laminating conditions.

The results of the examples are summarized in Table I. The measurements clearly show the appreciable additional improvement of strength produced by the bonding size composed of the above-described modified vinyl chloride-vinyl trialkoxysilane copolymers, and on the other hand they show how the strength increase depends on the applied quantity or coating thickness of the said bonding sizes.

The effect of the bonding size is especially evidenced by a very great increase in the bending strength (DIN 53,452), which is a 100 to 140% improvement in comparison to the unsized glass fiber material when the bonding size coating thicknesses range between 100 and 300 millimicrons. By such bonding layers the tensile strength (DIN 53,455), the modulus of elasticity (DIN 53,452) and the U-notch impact toughness (DIN 53,453) are also improved by about 20 to 40%. Furthermore, the Vicat thermal stability of shape (DIN 53,453) is improved by about 10°C.

When the above-described bonding sizes are used, not only are the strength characteristics materially improved, but also the manufacture of glass fiber reinforced VC thermoplastic materials is decidedly simplified. The manufacture of laminates particularly is faciliated by the bonding size. When glass fiber material dressed with the bonding size is used, the achievement of optimum strength increases in VC thermoplastics no longer requires special, narrowly restricted manufacturing conditions, such as the preheating of the glass fiber material and the use of high working temperatures and pressures close to the stability limit of the VC thermoplastics.

EXAMPLE 1

In the manufacture of a 4 mm thick laminate of hard PVC (suspension polymer, K value 60), the reinforcement is a glass silk, plain-woven fabric with a specific weight of 160 g/m² whose warp and filling threads consist of E glass silk fibers with a 9 micron cross section and a fineness of 680 dtex [= textile deniers]. This glass silk fabric (commercial product 92 105/112 of Interglas, Ulm) was desized by a thermal process.

To make a 4 mm laminate measuring 200 × 200 mm, which when finished is to have a glass fiber content of 30% by weight, 12 squares of glass silk fabric measuring 198 × 198 mm and having a total weight of 78 grams are coated by wet impregnation in a partial vacuum with 5 wt-% of a modified vinyl chloride-vinyl trialkoxysilane copolymer consisting of 75 wt-% vinyl chloride, 5 wt-% triethoxysilane, 5 wt-% dicyclohexylfumarate and 15 wt-% of $\beta$-$C_{8-10}$-alkyl-pivalinic acid vinyl ester. In accordance with the absorbency of the glass silk fabric and the viscosity of the copolymer solution, this requires 48.8 g of an 8.0 wt-% solution of the copolymer in acetic acid ethyl ester to which 1 wt-% of epoxidized soybean oil (Advastab 39 of Deutsche Advance GmbH) has been added as stabilizer. This quantity corresponds to an average bonding size thickness of about 200 to 220 millimicrons. The copolymer used here as the binding size will be referred to as CP I, for the sake of brevity, in the following examples and in Table I.

The 12 pieces of glass silk fabric thus pretreated and dried to evaporate the solvent by heating at about 100°C, are alternately sandwiched with 13 hard PVC sheets measuring 200 × 200 × 0.25 mm, and the stack thus obtained is laid in a platen press preheated to 185°C using a mold or metal frame of appropriate size. After 2 minutes of heating time at low starting pressure, the stack is pressed for 4 minutes at 50 kp/cm² into the laminate. The laminate, after the removal of flashes, has a total weight of 260 g and a glass fiber content of 30%. The results of the measurement of the strength characteristics of the laminte are listed in the appended Table I.

EXAMPLES 2 TO 7

The laminates are prepared as described in Example 1, except that one of the following different thicknesses of the bonding size composed of copolymer CP I is applied to the glass silk fabric named in Example 1, namely 0.8, 2.0, 7.5, 10 and 15% CP I, referred to the glass silk fabric weight. These thicknesses or applied quantities, as the case may be, are achieved with the following solution concentrations and quantities of the copolymer CP I in acetic acid ethyl ester: for the 12 glass silk fabric pieces (total 78 g) in each case, an applied quantity of CP I of 2. 0.8 wt-% is achieved with 31.2 g of a 2.0 wt-% CP I solution,
3. 2.0 wt-% is achieved with 39.0 g of a 4.0 wt-% CP I solution,
4. 7.5 wt-% is achieved with 46.8 g of a 12.5 wt-% CP I solution,
5. 10 wt-% is achieved with 62.4 g of a 12.5 wt-% CP I solution,
6. 12.5 wt-% is achieved with 65.0 g of a 15.0 wt-% CP I solution,
7. 15 wt-% is achieved with 66.8 g of a 17.5 wt-% CP I solution.

The test results obtained with the six 4 mm thick laminates prepared from these are given in Table I.

EXAMPLES 8 TO 12

The laminates are made as described in Example 1, except that the following five different thicknesses or applied quantities of copolymer CP II, composed of 70 wt-% vinyl chloride, 10 wt-% vinyl triethoxysilane, 5 wt-% dicyclohexylfumarate and 15 wt-% $C_{8-10}$ alkyl pivalinic acid vinyl ester, are used on the glass silk fabric 92 105/112 specified in Example 1 to produce the five laminates. To obtain the desired different thicknesses of the bonding coat, the 12 glass fabric pieces, totaling 78 grams, required for each laminate can be wet-impregnated with the following quantities of the various concentrated solutions of copolymer CP II in acetic acid ethyl ester:

8. for 0.8 wt-% CP II, 39.0 g of 1.6 wt-% CP II solution,
9. for 2.0 wt-% CP II, 39.0 g of 4.0 wt-% CP II solution,
10. for 5.0 wt-% CP II, 39.0 g of 10.0 wt-% CP II solution,
11. for 7.5 wt-% CP II, 46.8 g of 12.5 wt-% CP II solution,
12. for 10.0 wt-% CP II, 52 g of 15.0 wt-% CP II solution.

The effects of the various CP II bonding coat thicknesses on the strength characteristics may be seen from the test results shown for laminates 8 to 12 in Table I.

EXAMPLE 13

(as standard of comparison)

For purposes of comparison with laminates 1 to 12, a laminate is made with the same structure and in the same manner as in Example 1, except that the thermally desized glass silk fabric 92 105/112 described in Example 1 was used without applying to it a bonding size composed of the copolymers of the invention.

EXAMPLE 14

Example 1 is repeated, the bonding coat being applied from an 8 wt-% solution of the following copolymers:

a. 92 wt-% vinyl chloride and 8 wt-% vinyl triethoxysilane
b. 72 wt-% VC, 8 wt-% vinyl trimethoxysilane, 10 wt-% dioctylmaleinate, 8 wt-% isooctylacrylate and 2 wt-% 2-ethylhexylvinyl ether.
c. 70 wt-% VC, 10 wt-% vinyl tri-t-butoxysilane, 8 wt-% of a vinyl versatic ester with a 9-carbon center in the chain, 5 wt-% di-2-ethylhexylfumarate and 7 wt-% isobutylvinyl ether.

Improvement in properties as indicated above, especially in tensile strength and bending strength, is thereby realized.

Table I

| Example No. | Composition and mechanical characteristics of laminates described in the Examples. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Type of glass fiber fabric | 92105 -112 | same | same | same | same | same | same | same | same | same | same | same | same |
| Glass fiber content, wt-% | 30 | 30 | 30 | 30 | 30 | 30 | 30 | 30 | 30 | 30 | 30 | 30 | 30 |
| Copolymer bonding size | CP I | CP I | CP I | CP I | CP I | CP I | CP I | CP II | CP II | CP II | CP II | CP II | none |
| Quantity of bonding size, wt-% w/ref. to glass fibers | 5.0 | 0.8 | 2.0 | 7.5 | 10.0 | 12.5 | 15.0 | 0.8 | 2.0 | 5.0 | 7.5 | 10.0 | — |
| Bending strength kp/cm² | 1795 | 1385 | 1505 | 1915 | 2050 | 2065 | 2120 | 1275 | 1465 | 1640 | 1760 | 1910 | 936 |
| Tensile strength kp/cm² | 1755 | 1530 | 1650 | 1770 | 1805 | 1810 | 1820 | 1430 | 1540 | 1655 | 1700 | 1760 | 1390 |
| Modulus of elasticity ×10³, kp/cm² | 101 | — | — | — | 105 | — | 112 | — | — | 101 | — | 110 | 81 |
| Impact toughness cmkp/cm² | 53 | 50 | 53 | 52 | 48 | 50 | 52 | 49 | 48 | 51 | 49 | 50 | 64 |
| U-notch impact toughness cmkp/cm² | 48 | 44 | 45 | 52 | 58 | 60 | 62 | 45 | 46 | 48 | 52 | 62 | 46 |
| Vicat thermal stability of shape (°C) (DIN 53,460 glycol, 5 kg) | 90 | 83 | 86 | 89 | 92 | 92 | 92 | 82 | 88 | 89 | 89 | 92 | 82 |

What is claimed is:

1. Polyvinylchloride or chlorinated polyvinylchloride polymer article reinforced with glass fibers coated with vinyl chloride-vinyl trialkoxysilane copolymers containing a major amount of vinyl chloride in an amount effective to increase the strength characteristics of the article.

2. Article according to claim 1, said copolymer being a copolymer of vinyl chloride, vinyl trialkoxysilane, and a modifier, the modifier being at least one of vinyl esters of saturated carboxylic acids, esters of ethylenically, unsaturated mono- or dicarboxylic acids, and alkylvinyl ethers.

3. Article according to claim 1, the amount of copolymer being 0.1 to 15.0 wt-% of the weight of the glass fiber.

4. Article according to claim 1, the amount of copolymer being 0.4 to 8.0 wt-% of the weight of the glass fiber.

5. Article according to claim 1, the proportion of vinyl chloride to vinyl trialkoxysilane being 90 to 95 wt-% vinyl chloride and 5 to 10 wt-% vinyl trialkoxysilane.

6. Article according claim 2, the proportion of said components of the copolymer being 68 to 77 wt-% vinyl chloride, 4 to 12 wt-% vinyl triakoxysilane, and 12 to 27 wt-% of modifier.

7. Article according to claim 2, the vinyl triakoxysilane being vinyl triethoxysilane, the modifier being β-alkylpivalic acid vinyl ester of the formula $C_{8-10}H_{17-21}$—$CH_2$—$C(CH_3)_2$—$COO$—$CH=CH_2$ and dicyclohexylfumarate, the proportion of the copolymer components being 68 to 77 wt-% vinyl chloride, 4 to 12 wt-% vinyl triethoxysilane, 8 to 17 wt-% of the vinyl ester, and 4 to 10 wt-% of the fumarate.

8. Article according to claim 7, the modifying components including alkylvinyl ether.

9. Article according to claim 1, the article being a laminate comprising alternating layers of said polymers and coated glass fibers.

10. Article according to claim 1, the glass fiber being in the form of glass silk fabric, glass fiber fabric, glass fiber mat or fleeces, short glass fibers or loose chopped glass silk strands 5 to 25 mm long or glass staple fibers.

11. Process for producing an article according to claim 1, which comprises inserting the coated glass fibers in said polymer and heating the resulting admixture to integrate said polymer and form said article.

12. Process according to claim 11, wherein the glass fibers are coated with said copolymer by applying a solution of the copolymer in an organic solvent or an aqueous dispersion of the copolymer to the glass fibers by wet impregnation.

13. Process according to claim 12, wherein the solution or dispersion contains 1 to 2 wt-% of epoxidized, unsaturated fatty acid ester as a heat stabilizer, and the solvent is an acetic ester, butanone, tetrahydrofuran.

14. Process according to claim 11, wherein the glass fibers, in desized state, are coated with the copolymer.

15. Process according to claim 11, wherein glass fibers sized with a chromium methacrylate complex or a substituted alkyl trialkoxysilane, are coated with said copolymer.

16. Glass fibers coated with vinyl chloride - vinyl trialkoxysilane copolymers containing a major amount of vinyl chloride, suitable for use in a polyvinyl chloride or chlorinated polyvinyl chloride polymer article for reinforcing said article.

17. Article according to claim 1, the vinyl trialkoxysilane being of the formula

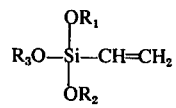

wherein $R_1$, $R_2$, and $R_3$ are alike or different branched or unbranched saturated alkyl groups, and is each of 1 to 18 carbon atoms.

18. Article according to claim 17, wherein each R is of 1 to 4 carbon atoms.

19. Article according to claim 18, said copolymer being a copolymer of vinyl chloride, vinyl trialkoxysilane, and a modifier, the modifier being at least one of vinyl esters of saturated carboxylic acids, esters of ethylenically, unsaturated mono- or dicarboxylic acids, and alkylvinyl ethers.

* * * * *